Patented May 11, 1937

2,080,191

UNITED STATES PATENT OFFICE 2,080,191

COMPLEX METAL COMPOUNDS OF DISAZO-DYESTUFFS

Fritz Straub and Hans Mayer, Basel, Switzerland, assignors to the firm Society of Chemical Industry in Basle, Basel, Switzerland No Drawing. Application March 28, 1935, Serial No. 13,582. In Switzerland January 24, 1935

1 Claim. (Cl. 260—11)

It has been found that dyestuffs containing metal in complex union can be produced by treating with agents yielding metal, disazo-dyestuffs of the general formula

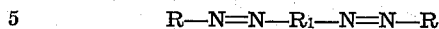

in which both R's stand for aryl-radicals of which at least one contains a lake-forming group, and $R_1$ stands for an aryl radical containing at least two amino groups.

The disazo-dyestuffs of the above formula, suitable as parent materials for this invention, may be made by coupling two similar or two different diazo-compounds, at least one of which contains a lake-forming group, with an arylene-amine, capable of coupling twice, for instance a phenylenediamine or a naphthylenediamine. Such diamines are, for example, 1,3-phenylenediamine, 1,3-phenylenediamine-4-sulfonic acid, 1,3-diamino-4-methyl-benzene, 1,3-naphthylenediamine, as well as their nitro-, alkoxy- and halogen substitution products, so far as these are adapted for coupling twice. Suitable diazo-compounds are, for example, those of amines of the benzene and naphthalene series which may contain, in ortho-position to the diazo-group, hydroxyl-, or carboxyl-, or alkoxy-, or the salicylic acid grouping; such diazo-compounds are, for example, those of amino-benzene, an amino-naphthalene, ortho-aminophenol, ortho-amino-naphthol, ortho-aminoalkoxy-benzene, ortho-aminoalkoxy-naphthalene, anthranilic acids, ortho-amino-naphthalene-carboxylic acids, amino-salicylic acids, as well as the sulfonic acids and nitro-, alkyl- and halogen-substitution products of these bodies.

The treatment of the disazo-dyestuffs of the foregoing formula with the agent that yields metal, for instance an agent yielding chromium, copper, iron, aluminium, cobalt, nickel, manganese, zinc, vanadium or titanium, may be in acid, neutral or alkaline medium, with or without a suitable addition, such as a salt of an inorganic or of an organic acid, or a free organic acid, and in presence or absence of an organic solvent, such as alcohol or pyridine and in an open vessel or under pressure. The reaction may occur with only one agent yielding metal or with several such agents, either simultaneously or in succession, and a single disazo-dyestuff or a mixture of disazo-dyestuffs. The treatment with the agent yielding metal may be such that a dyestuff is produced wherein each lake-forming group of the dyestuff molecule contains one atom or more than one atom or less than one atom of metal. The dyestuffs containing less than one atom of metal may be made, for instance, by causing a complex metal compound of the disazo-dyestuff of the foregoing formula to act on a like disazo-dyestuff which does not contain metal; if desired the dyestuff thus obtained may be treated further with an agent yielding metal. The treatment with the agent yielding metal may, quite generally, occur simultaneously with the production of the dyestuff and in many cases not only in substance but also on the fibre or in the dye-bath.

A variation of the process consists in first treating with an agent yielding metal a monoazo-dyestuff of the formula

containing a lake-forming group wherein R and $R_1$ have the above designated meanings, produced by coupling a diazo-compound containing a lake-forming group with an aryl-derivative containing at least two amino-groups and capable of coupling twice, the treatment being followed by a second coupling to form the disazo-dyestuff. In carrying out the second coupling there may be used also complex metal compounds from mixtures of monoazo-dyestuffs.

This modified process can be further developed by treating with a metal-yielding agent the dyestuffs thus obtainable, in particular if in the second coupling there is also used a component containing a lake-forming group. Both in the case of the modified process and the further development of this modification, there may be used one or more agents yielding metal and dyestuffs obtained in which each lake-forming group of the dyestuff molecule contains one atom or less than one atom or more than one atom of metal.

The complex metal compounds made by this invention may be used for dyeing animal fibers, such as wool and silk. They are chiefly suitable for dyeing leather tanned in any manner, for instance chrome leather or vegetable tanned leather; they dye the leather in level, very fast tints, particularly brown.

The following examples illustrate the invention, the parts being by weight unless otherwise stated, and the parts by weight and parts by volume being related to each other as is the kilo to the litre:—

Example 1

15.4 parts of 4-nitro-2-amino-1-phenol are dissolved in 40 parts of water and 20.7 parts of hydrochloric acid of 30 per cent. strength. The solution is cooled by addition of ice and, at 5–10° C., it is diazotized by means of 6.9 parts of sodium nitrite. The diazo-compound is now neutralized with 40 parts by volume of sodium carbonate solution of 10.6 per cent. strength and there is then added a solution, cooled to 5° C. with ice, of 10.9 parts of 1,3-diaminobenzene in 100 parts of water mixed with 13.3 parts of caustic soda solution of 30 per cent. strength. The whole is stirred at 5–10° C. until the diazo-reaction disappears, which happens in about an hour, 13.3 parts of caustic soda solution of 30 per cent. strength are added and thereupon there is added the diazo-solution, made in the usual manner from 23.4 parts of 4-nitro-2-amino-1-phenol-6-sulfonic acid and neutralized with sodium carbonate solution. Stirring is continued at 12–18° C. for 12–15 hours, whereby the coupling is completed. The whole is heated to 60° C., 11.5 parts of hydrochloric acid of 30 per cent. strength are added, the mixture is heated to boiling and there are added 24.3 parts of ferric chloride in the form of an aqueous solution of 32 per cent. strength, whereafter boiling is continued for 1 hour under reflux. The iron compound of the dyestuff of the formula

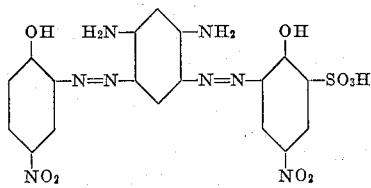

is now salted out with 100 parts of common salt, filtered and dried at a moderate temperature. There is obtained an olive black powder easily soluble in water to a greenish dark brown solution and dyeing chrome-tanned leather in a neutral bath dark olive-brown, fast tints.

Example 2

23.4 parts of 4-nitro-2-amino-1-phenol-6-sulfonic acid are diazotized in the usual manner and made neutral to Congo red by addition of dilute sodium carbonate solution. The mixture is added to a solution, cooled to 5° C., of 10.9 parts of 1,3-diaminobenzene in 100 parts of water. The coupling occurs quickly and is complete after stirring for about 1 hour at 5–10° C. The dyestuff which has separated is filtered and washed with some cold water. The dyestuff paste thus obtained is dissolved in 250 parts of water and 13.3 parts of caustic soda solution of 30 per cent. strength the solution is cooled to 10° C. and mixed with the diazo-solution, made in the usual manner from 14.35 parts of 4-chloro-2-amino-1-phenol and neutralized with sodium carbonate. Stirring is continued for 18–24 hours at 12–16° C., whereupon formation of the dyestuff is at an end and the diazo-compound has disappeared. The whole is heated to boiling and mixed with a mixture made from 40 parts by volume of an aqueous ferric chloride solution of 32.4 per cent. strength and 20 parts by volume of an aqueous copper sulfate solution of 25 per cent. strength, and is then kept boiling for ¼ hour. The metal compound of the dyestuff of the formula

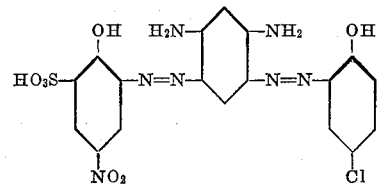

is completely precipitated; it is filtered, washed and dried at a moderate temperature. The brown-black powder obtained dissolves in water, somewhat sparingly, to a yellowish brown solution and freely in sodium carbonate solution to a reddish, dark brown solution. In a neutral bath chrome-tanned leather is dyed reddish-dark-brown tints by this dyestuff.

Example 3

23.4 parts of 6-nitro-2-amino-1-phenol-4-sulfonic acid are diazotized in the usual manner. The neutralized diazo-compound is allowed to flow, within a quarter of an hour, into a solution of 10.9 parts of 1,3-diaminobenzene in 100 parts of water and 11.5 parts of hydrochloric acid of 30 per cent. strength, the temperature being 8–10° C. Coupling occurs somewhat quickly and the dyestuff is separated completely. When the diazo-compound has disappeared the dyestuff is filtered and washed. The paste thus obtained is dissolved in 350 parts of water and 13.3 parts of caustic soda solution of 30 per cent. strength, and the solution is mixed, at 60° C., with an aqueous solution, of alkaline reaction to phenolphthalein, of 8.1 parts of ferric chloride, 3.75 parts of tartaric acid, 40 parts of water and 34 parts of caustic soda solution of 30 per cent. strength. The whole is now heated for 2 hours at 70–75° C., whereby all the metal is taken up by the dyestuff. The solution is now cooled to 10° C. and coupled with a diazo-compound, made in the usual manner, from 15.4 parts of 4-nitro-2-amino-1-phenol and neutralized with sodium carbonate. After stirring for 18–20 hours at 12–18° C. the mixture is boiled, 16.2 parts of ferric chloride are added and the whole is boiled under reflux for 1 hour. The iron compound of the disazo-dyestuff of the formula

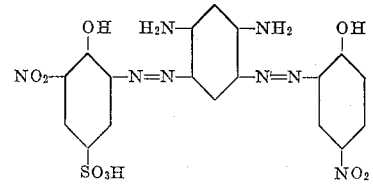

separates completely from the mixture and when filtered and washed and dried at a moderate temperature is a brown-black powder, soluble in water to a violetish-brown solution. In a neutral bath it dyes chrome-tanned leather blackish violet-brown tints.

Example 4

10.9 parts of 1,3-diaminobenzene are dissolved in 100 parts of water and the solution is cooled to 0° C. with ice. There is then added a metal hydroxide suspension made from 12.15 parts of ferric chloride, 7 parts of crystallized nickel sulfate, 60 parts of water and 43 parts of caustic soda solution of 30 per cent. strength, and then a further 13.3 parts of caustic soda solution of 30 per cent. strength are added. To the mixture thus prepared and cooled to 3° C. there is run in a mixture of diazo-solutions from 14.35 parts of 4-chloro-2-amino-1-phenol and 23.4 parts of 4-nitro-2-amino-1-phenol-6-sulfonic acid, which have been made in the usual manner and neutralized with sodium carbonate. The whole is stirred for 18–20 hours at 10–18° C., whereby the coupling is completed. The whole is now boiled, which brings completely into solution the metal compound of the dyestuff, and boiling is continued for 1 hour under reflux. The ferro-nickel compound of the dyestuff of the formula

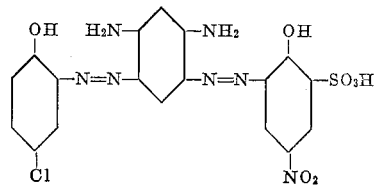

is now salted out by the addition of 150 parts of common salt and 15 parts of hydrochloric acid of 30 per cent. strength, filtered, pressed and dried at a moderate temperature. It is a brown-black powder, soluble in water freely to a violetish-brown solution and dyeing vegetable- and chrome-tanned leather fast, dark brown tints.

Example 5

37.1 parts of the manganous compound of the dyestuff from diazotized 4-chloro-2-amino-1-phenol-6-sulfonic acid and 1,3-diaminobenzene are dissolved in 400 parts of water and 27 parts of caustic soda solution of 30 per cent. strength and the solution is cooled to 10° C. To this solution there is added the diazo-compound, made in the usual manner, from 18.8 parts of 2-amino-1-phenol-4-sulfamide and neutralized with sodium carbonate, coupling being continued for some hours at 10–17° C. The whole is now heated to 60° C., 11.5 parts of hydrochloric acid of 30 per cent. strength are added, the mixture is boiled and mixed with 7.6 parts of $Cr_2O_3$ in the form of a solution of chromium fluoride. After boiling under reflux for 20 hours and separating the metal compound of the dyestuff of the formula

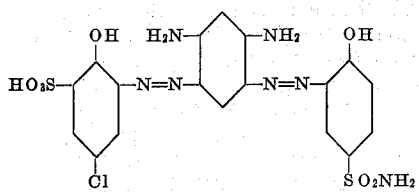

thus produced by adding 100 parts of common salt, filtration and drying at a moderate temperature follow. There is obtained a black powder which dissolves freely in water to a violetish brown solution. The dyestuff dyes chrome-tanned leather in a neutral bath violet-brown tints.

Example 6

37.3 parts of a cobalt-compound of the dyestuff from diazotized 4-chloro-2-amino-1-phenol-6-sulfonic acid and 1,3-diaminobenzene, are dissolved in 400 parts of water and 27 parts of caustic soda solution of 30 per cent. strength and the solution is cooled to 10° C.; there is added the diazo-compound, made in the usual manner, from 13.7 parts of 2-aminobenzene-1-carboxylic acid and neutralized with sodium carbonate, the coupling being continued for some hours at 10–17° C. The whole is now warmed to 40° C., mixed with 11.5 parts of hydrochloric acid, heated to boiling, mixed with 10 parts of aluminium acetate and boiled under reflux for 2 hours. The metal compound of the dyestuff of the formula

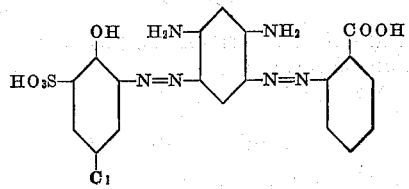

thus produced is salted out with 150 parts of common salt, filtered and dried at a moderate temperature. There is obtained a brown-black powder, soluble in water to a brownish-violet solution. The dyestuff dyes leather blackish-violet-brown tints.

Example 7

37.3 parts of the nickel compound of the dyestuff from diazotized 4-chloro-2-amino-1-phenol-6-sulfonic acid and 1,3-diaminobenzene are dissolved in 400 parts of water and 27 parts of caustic soda solution of 30 per cent. strength; this solution is cooled to 10° C. and coupled with the diazo-compound, made in the usual manner, from 15.1 parts of 4-acetylamino-1-amino-benzene and neutralized; coupling is allowed to proceed for some hours at 12–15° C. When the diazo-compound has disappeared the whole is heated to 50° C., 11.5 parts of hydrochloric acid of 30 per cent. strength are added and 100 parts of common salt; the metal compound of the dyestuff of the formula

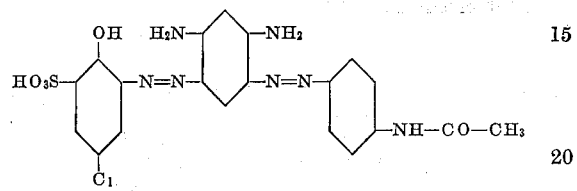

thus salted out is filtered and dried at a moderate temperature. The brown-black powder thus obtained is somewhat sparingly soluble in water but easily soluble in sodium carbonate solution to a yellowish-brown solution in each case. It dyes chrome-tanned leather in a neutral bath fast, reddish-brown tints.

Example 8

10.9 parts of 1,3-diaminobenzene are dissolved in 100 parts of water and 23 parts of hydrochloric acid of 30 per cent. strength, the solution is cooled to 5° C. and mixed with the diazo-compound prepared in the usual manner from 23.4 parts of 6-nitro-2-amino-1-phenol-4-sulfonic acid. In the course of 3 hours there is added by drops, at 8–12° C., a solution of 26 parts of crystallized sodium acetate in 50 parts of water, and the mixture is stirred until the diazo-compound has disappeared. The monoazo-dyestuff which has separated is filtered and washed. The dyestuff paste thus obtained is dissolved in 200 parts of water and 27 parts of caustic soda solution of 30 per cent. strength, and there is added the diazo-compound obtained in the usual manner from 15.3 parts of 5-amino-2-hydroxy-1-benzoic acid and neutralized with sodium carbonate; the coupling is continued for 18 hours at 12–18° C. The mixture is now heated to 60° C., 11.5 parts of hydrochloric acid of 30 per cent. strength are added, heating is continued to boiling and 24.3 parts of ferric chloride are added; the iron-compound of the dyestuff is then produced by boiling under reflux for 1 hour. The metal compound of the dyestuff of the formula

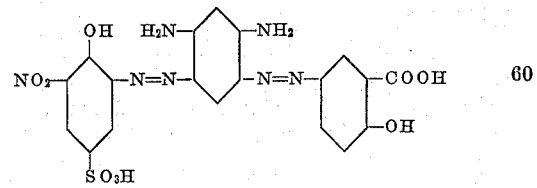

which has separated is filtered, washed and dried at a moderate temperature or in a vacuum. There is obtained a brown powder which dissolves freely in sodium carbonate solution to a yellowish-brown solution and dyes leather fast brown tints.

Example 9

12.3 parts of 1-methyl-2,4-diaminobenzene are dissolved in 100 parts of water, the solution is cooled with ice to 3° C. and mixed with a suspension of metal hydroxide made from 12.15 parts of ferric chloride, 6.25 parts of crystallized copper sulfate, 60 parts of water and 43 parts of caustic soda solution of 30 per cent. strength. There are then added a further 13.3 parts of caustic soda solution of 30 per cent. strength and the diazo-mixture made in the usual manner from 15.4 parts of 4-nitro-2-amino-1-phenol and 23.4 parts of 4-nitro-2-amino-1-phenol-6-sulfonic acid and neutralized with sodium carbonate. Coupling is continued for 24 hours at 10–20° C. The whole is now heated to boiling, kept boiling for 1 hour and the metal compound of the dyestuff of the formula

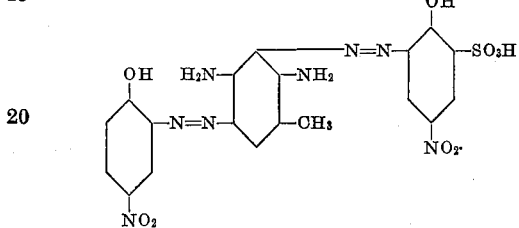

thus formed is salted out by means of 100 parts of common salt and 13.8 parts of hydrochloric acid of 30 per cent. strength, filtered and dried at a moderate temperature in a vacuum. There is obtained a black powder, soluble in water to a blackish-brown solution and dyeing chrome-tanned leather in a neutral bath fast dark brown tints.

*Example 10*

40 parts of the dyestuff from diazotized 4,6-dinitro-2-amino-1-phenol and 1,3-diaminobenzene-4-sulfonic acid are dissolved in 200 parts of water and 13.3 parts of caustic soda solution; 10.6 parts of calcined sodium carbonate are added and the diazo-compound, obtained in the usual manner from 31.9 parts of 1-amino-8-hydroxynaphthalene-3,6-disulfonic acid. The coupling is continued for 20 hours at 10–18° C. and the solution is heated to boiling and mixed with 11.5 parts of hydrochloric acid of 30 per cent. strength and 28.1 parts of crystallized cobaltous sulfate. It is kept boiling for half-an-hour. The cobalt compound of the dyestuff of the formula

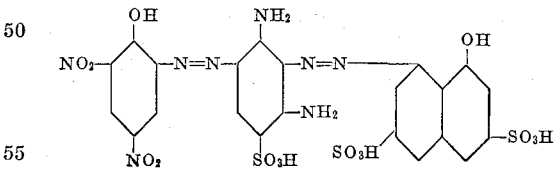

thus formed is now separated by salting out or by concentrating the solution on the water-bath; it is filtered and dried at a moderate temperature. There is obtained a blue-black powder which dissolves in water freely to a brownish-red solution. The dyestuff dyes chrome-tanned leather in a neutral bath dark beige-brown tints.

*Example 11*

10.9 parts of 1,3-diaminobenzene are dissolved in 100 parts of water and the solution is coupled in a neutral medium at 15° C. with 29.5 parts of 1-diazo-2-hydroxynaphthalene-4-sulfonic acid, nitrated in the 6-position. After 20 hours there are added 13.3 parts of caustic soda solution of 30 per cent. strength and the diazo-compound made in the usual manner from 23.4 parts of 6-nitro-2-amino-1-phenol-4-sulfonic acid and neutralized; stirring is continued for 24 hours at 12–18° C.

The mixture is now boiled, mixed with a solution of 16.2 parts of ferric chloride and 14.1 parts of crystallized nickel sulfate in 100 parts of water, kept boiling for 1 hour and the metal compound of the dyestuff of the formula

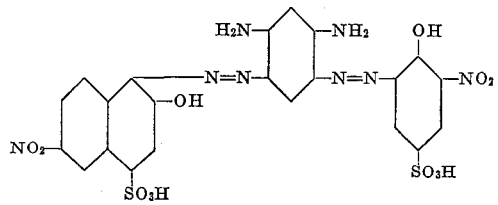

then salted out. After filtration and drying there is obtained a black powder, freely soluble in water or sodium carbonate solution to a violetish-brown solution. The dyestuff dyes leather blackish copper-brown tints.

*Example 12*

10.9 parts of 1,3-diaminobenzene are dissolved in 50 parts of hot water; the solution is cooled to 5° C. and there is added a suspension of metal hydroxides made from 10.7 parts of ferric chloride, 9.3 parts of crystallized nickel sulfate, 60 parts of water and 43 parts of caustic soda solution of 30 per cent. strength. There are then added a further 13.3 parts of caustic soda solution of 30 per cent. strength together with the diazo-mixture made in the usual manner from 15.4 parts of 4-nitro-2-amino-1-phenol and 23.4 parts of 4-nitro-2-amino-1-phenol-6-sulfonic acid and neutralized with sodium carbonate. Coupling is continued for 10–12 hours at 12–18° C., the whole is heated to boiling and boiled for an hour; the metal compound of the dyestuff of the formula

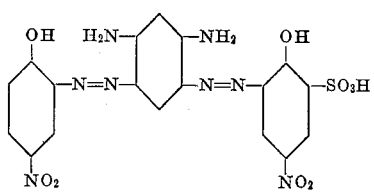

is salted out by the addition of 15 parts of hydrochloric acid of 30 per cent. strength and 150 parts of common salt. After filtration and drying there is obtained a black powder which dissolves easily in water to an olive-brown solution; it dyes leather olive dark-brown tints.

*Example 13*

A mixture of 56.4 parts of the primary disazo-dyestuff of the formula

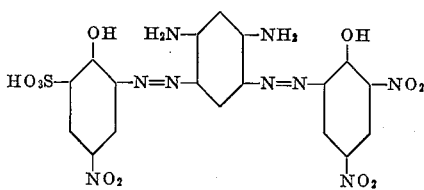

and 1000 parts of water is boiled and mixed with 18 parts of $Cr_2O_3$ in the form of chromium fluoride. This mixture is boiled under reflux for 24 hours, the chromium compound thus formed is salted out, filtered and dried at a moderate temperature. There is obtained a dark brown powder, soluble freely in water to a violet-brown solution. In a neutral bath the dyestuff dyes chrome-tanned leather violet-brown tints.

The following table is a category of dyestuffs obtainable by this invention and the colors produced by them when used for dyeing chrome-tanned leather:

(5) 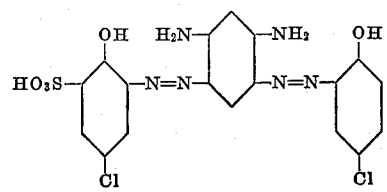

|  | First diazo-compound | Second diazo-compound | Coupling component | Metal | Dyeing on chrome-leather |
|---|---|---|---|---|---|
| 1. | 4-nitro-2-amino-1-phenol-6-sulfonic acid. | 4-nitro-2-amino-1-phenol-6-sulfonic acid. | 1,3-diaminobenzene | Fe | Blackish olive brown. |
| 2. | Do | 4-nitro-2-amino-1-phenol | do | 90 Fe, 10 Cu. | Blackish red-brown. |
| 3. | Do | 6-nitro-2-amino-1-phenol-4-sulfonic acid. | do | 80 Fe, 20 Cu. | Violetish black-brown. |
| 4. | 6-nitro-2-amino-1-phenol-4-sulfonic acid. | 4-sulfo-2-amino-1-benzoic acid | do | Fe | Yellowish brown. |
| 5. | Do | 1,5-naphthylamine-sulfonic acid | do | Fe | Blackish brown. |
| 6. | 4-chloro-2-amino-1-phenol-6-sulfonic acid. | 4-chloro-2-amino-1-phenol | do | Fe | Blackish beige-brown. |
| 7. | 6-nitro-2-amino-1-phenol-4-sulfonic acid. | 4-nitro-2-amino-1-phenol | do | Fe | Violetish dark-brown. |
| 8. | 4-nitro-2-amino-1-phenol-6-sulfonic acid. | do | do | 80 Fe, 20 Co. | Blackish brown. |
| 9. | 4-nitro-2-amino-1-phenol-6-sulfonic acid. | do | do | 80 Fe, 20 Ni. | Blackish brown. |
| 10. | Do | do | do | 80 Fe, 20 Mn. | Yellowish brown. |
| 11. | Do | 4-chloro-2-amino-1-phenol-6-sulfonic acid. | do | Fe | Yellowish brown. |
| 12. | Do | 4-nitro-2-amino-1-phenol | do | 80 Fe, 20 Cu. | Blackish brown. |
| 13. | 4-chloro-2-amino-1-phenol-6-sulfonic acid. | 4-nitro-2-amino-1-phenol | do | Fe | Blackish beige-brown. |
| 14. | 4-nitro-2-amino-1-phenol-6-sulfonic acid. | 6-nitro-2-amino-1-phenol-4-sulfonic acid. | do | Fe | Greyish brown. |
| 15. | Do | 4-chloro-2-amino-1-phenol | do | Fe | Dark brown. |
| 16. | Do | 4-nitro-2-amino-1-phenol | do | 75 Fe, 25 Ni. | Do. |
| 17. | 6-nitro-2-amino-1-phenol-4-sulfonic acid. | 4-chloro-2-amino-1-phenol | 1,3-diamino-benzene-4-sulfonic acid. | 50 Cu, 50 Co. | Violet-brown. |
| 18. | 4-nitro-2-amino-1-phenol | 4-nitro-2-amino-1-phenol | do | Fe | Yellowish brown. |

The non-metalliferous disazo-dyestuffs in the above table have the following formulas:—

(1) 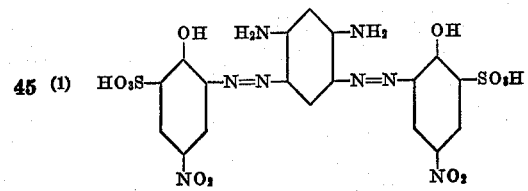

(6) 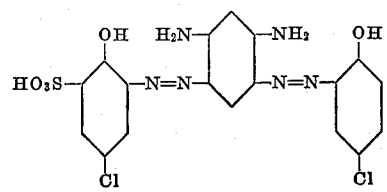

(2) 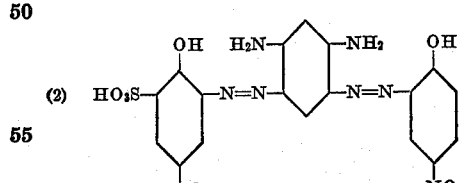

(7) 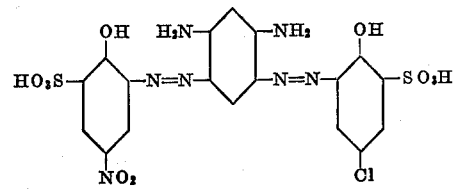

(3) 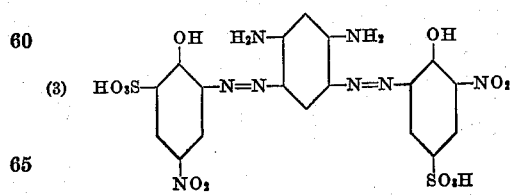

(8) 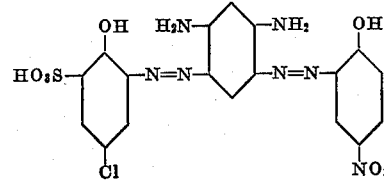

(4) 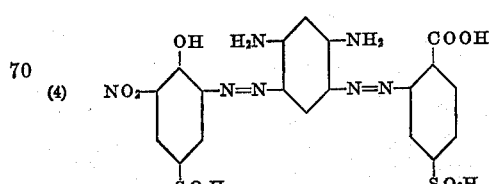

(9) 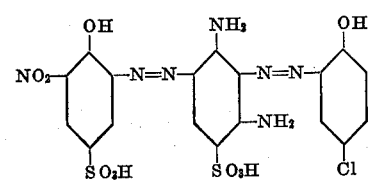

What we claim is:—
Disazo-dyestuffs containing iron and nickel in complex union, of the formula
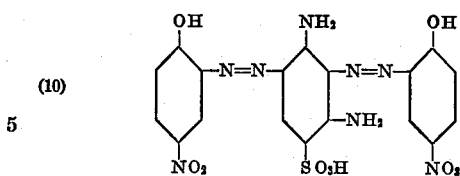
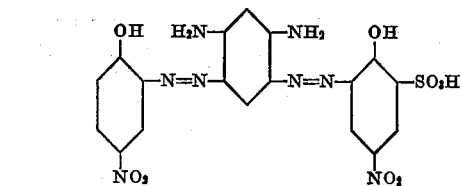
which are black powders soluble in water and dyeing animal fibers, particularly leather, uniform brown tints of good fastness.
FRITZ STRAUB.
HANS MAYER.